United States Patent
Li et al.

(10) Patent No.: US 7,035,060 B2
(45) Date of Patent: Apr. 25, 2006

(54) EASILY MANUFACTURED EXCHANGE BIAS STABILIZATION SCHEME

(75) Inventors: Yun-Fei Li, Fremont, CA (US); Hui-Chuan Wang, Pleasanton, CA (US); Chyu-Jiuh Torng, Pleasanton, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 506 days.

(21) Appl. No.: 10/091,959

(22) Filed: Mar. 6, 2002

(65) Prior Publication Data

US 2003/0167625 A1  Sep. 11, 2003

(51) Int. Cl.
*G11B 5/127* (2006.01)
(52) U.S. Cl. .................................. 360/324.12
(58) Field of Classification Search ........... 360/324.12, 360/324
See application file for complete search history.

(56) References Cited

U.S. PATENT DOCUMENTS

| | | | |
|---|---|---|---|
| 5,637,235 A | 6/1997 | Kim et al. | 216/22 |
| 5,856,897 A | 1/1999 | Mauri | 360/113 |
| 6,118,624 A | 9/2000 | Fukuzawa et al. | 360/113 |
| 6,185,079 B1 | 2/2001 | Gill | 360/324.2 |
| 6,266,218 B1 | 7/2001 | Carey et al. | 360/324.12 |
| 6,313,973 B1 | 11/2001 | Fuke et al. | 360/324.1 |
| 6,633,466 B1 * | 10/2003 | Sakaguci et al. | 360/327.31 |
| 2003/0156361 A1 * | 8/2003 | Li et al. | 360/324.12 |

OTHER PUBLICATIONS

S.S.P. Parkin, "Systematic Variation of the Strength and Oscillation Period of Indirect Magnetic Exchange Coupling through the 3d, 4d and 5d Transition Metals, " Phys. Rev. Lett, vol. 67, p. 3598, 1991.
B. Dieng et al., "Giant Magnetoresistance in soft ferromagneitc multilayers," Phys. Rev. B, vol. 43, p. 1297, 1991.

* cited by examiner

*Primary Examiner*—David Davis
(74) *Attorney, Agent, or Firm*—George O. Saile; Stephen B. Ackerman

(57) ABSTRACT

A problem associated with current bottom spin valve designs is that it is difficult to avoid magnetic charge accumulation at the edge of the sensor area, making a coherent spin rotation during sensing difficult to achieve. This problem has been eliminated by introducing an exchange coupling layer between the free layer and the ferromagnetic layer that is used to achieve longitudinal bias for stabilization and by extending the free layer well beyond the sensor area. After all layers have been deposited, the read gap is formed by etching down as far as this layer. Since it is not critical exactly how much of the biasing layers (antiferromagnetic as well as ferromagnetic) are removed, the etching requirements are greatly relaxed. Whatever material remains in the gap is then oxidized thereby providing a capping layer as well as a good interface for specular reflection in the sensor region.

17 Claims, 2 Drawing Sheets

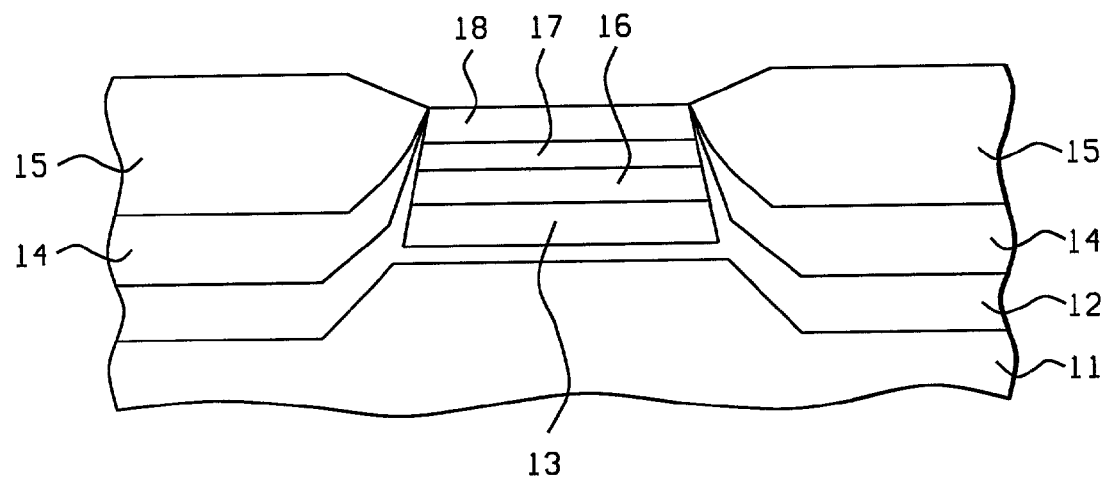
FIG. 1 – Prior Art
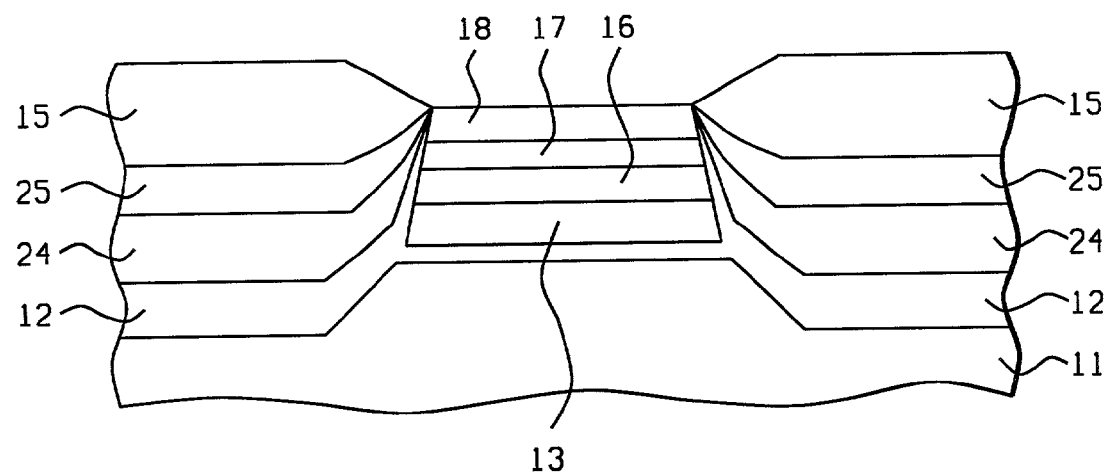
FIG. 2 – Prior Art

EASILY MANUFACTURED EXCHANGE BIAS STABILIZATION SCHEME

FIELD OF THE INVENTION

The invention relates to the general field of read heads for magnetic disk systems with particular reference to bias stabilization.

BACKGROUND OF THE INVENTION

The principle governing the operation of the read sensor in a magnetic disk storage device is the change of resistivity of certain materials in the presence of a magnetic field (MR or magneto-resistance). Magneto-resistance can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole The key elements of what is termed a top spin valve are, starting at the lowest level, a seed layer, a free magnetic layer, a non-magnetic spacer layer, a magnetically pinned layer, a pinning layer, and capping layer. When this order of layering is Inverted the resulting structure has the free layer at the top and is termed a bottom spin valve. The present invention is concerned with the latter type. One advantage of this type of design is that the capping layer, if made of certain materials, can, in addition to protecting the GMR stack from corrosion, also bring about more specular reflection at the free layer-capping layer interface, thereby increasing the conductance. Isolation of the device from extraneous magnetic fields is achieved by sandwiching it between two magnetic shield layers.

Although the layers enumerated above are all that is needed to produce the GMR effect, additional problems remain. In particular, there are certain noise effects associated with such a structure. As first shown by Barkhausen in 1919, magnetization in a layer can be irregular because of reversible breaking of magnetic domain walls, leading to the phenomenon of Barkhausen noise. The solution to this problem has been to provide a device structure conducive to single-domain films for the GMR sensor and to ensure that the domain configuration remains unperturbed after processing and fabrication steps and under normal operation. This is most commonly accomplished by giving the structure a permanent longitudinal bias provided by two opposing permanent magnets.

Today, the most common sensor stabilization scheme uses a hard bias abutted junction structure as illustrated in FIG. 1. Seen there are substrate 11, seed layer 12, and layer 13 which represents an antiferromagnetic pinning layer as well as a pair of antiparallel pinned layers. Layer 16 is a copper spacer layer, layer 17 is the free layer, and layer 18 is a capping layer. The read element width is defined by the edges that were milled out by etching. These edges are stabilized through the magneto-static coupling provided by the adjacent hard bias layer 14 which is separated from the sensor by non-magnetic seed layer 12. This hard bias layer is traditionally similar to those magnetic media materials which offer large coercivity, typically several thousands Oesterds.

The major problem of this scheme is that it breaks the magnetic continuity of the GMR sensor, and so cannot avoid magnetic charge accumulation at the edge of the sensor area, making a coherent spin rotation during sensing difficult to achieve without proper biasing. Traditional methods require a large magnetic moment to be put on the edge and utilize magnetostatic coupling to stabilize the edge spins. As the sensor size shrinks, these extra moments stiffen the whole sensor thus reducing sensor sensitivity to the media field. On the other hand, without these extra moments, transition through a multi-domain state is unavoidable during sensing. This could lead to higher noise level and reduce the sensitivity of the GMR sensor. This becomes more and more serious as the sensor size reduces and the sensor edge region occupies a larger and larger proportion of the total GMR sensor area.

One simple alternative is to replace the hard bias layer with an exchange biased magnetic layer as shown in FIG. 2. Seen there is soft magnetic layer 24 which is permanently magnetized through exchange coupling with antiferromagnetic (AFM) layer 25. Due to the abrupt cut of the junction edge in this scheme, it does not show a significant advantage relative to the hard bias scheme. To ensure magnetic continuity in the GMR sensor, it is preferred that the top magnetic layer not be touched during processing.

There are other schemes utilizing exchange bias to stabilize the GMR sensor edge. However, they all require extreme process control, like a few angstroms level etch control in order to be implemented. In the present invention we disclose a different approach, which provides a certain degree of specular reflection, a relatively large process window, a high exchange bias and convenience of integration into current existing process capabilities.

A routine search of the prior art was performed with the following publications of interest being found:

1. S. S. P. Parkin, "Systematic Variation of the Strength and Oscillation Period of Indirect Magnetic Exchange Coupling through the 3d, 4d, and 5d Transition Metals", Phys. Rev. Lett., Vol. 67, P. 3598, 1991.

2. B. Dieny, V. S. Speriosu, S. S. P. Parkin, B. A. Gurney, D. R. Wilhoit and D. Mauri," Giant Mangnetoresistance in soft ferromagnetic multilayers", Phys. Rev. B, Vol. 43, P. 1297, 1991.

The following patents were also encountered during our search.:

In U.S. Pat. No. 6,266,218, Carey et al. show a GMR with a Bottom SV and patterned exchange process. U.S. Pat. No. 5,637,235 (Kim) discloses a BSV while U.S. Pat. No. 6,185,079 (Gill) shows an exchange biases DSV. U.S. Pat. No. 5,856,897 (Mauri) is a related GMR with AFM and FM layers. In U.S. Pat. No. 6,118,624, Fukuzawa et al. discuss abutted junctions and in U.S. Pat. No. 6,313,973 Fuke et al. describe laminated exchange coupling.

SUMMARY OF THE INVENTION

It has been an object of at least one embodiment of the present invention to establish exchange bias in the lead region of a bottom spin valve without loss of GMR sensor sensitivity.

Another object of at least one embodiment of the present invention has been to maintain specular reflection in said GMR sensor.

Still another object of at least one embodiment of the present invention has been to provide a process for manufacturing said bottom spin valve.

A further object of at least one embodiment of the present invention has been that said process not require excessively tight etch control.

A still further object of at least one embodiment of the present invention has been that it be possible to deposit all layers involved in said process during a single pumpdown.

These objects have been achieved by introducing an exchange coupling layer between the free layer and ferromagnetic layer that is used to achieve longitudinal bias for stabilization. After all layers have been deposited, the read gap is formed by etching down as far as this layer. Since it is not critical how much of the biasing layers (antiferromagnetic as well as ferromagnetic) are removed, the etching requirements are greatly relaxed. Whatever material remains in the gap is then oxidized thereby providing a capping layer as well as good interface in the sensor region for specular reflection.

BRIEF DESCRIPTION OF THE DRAWINGS

FIG. 1 shows a bottom spin valve of the prior art including longitudinal hard bias.

FIG. 2 shows a bottom spin valve of the prior art including longitudinal exchange bias.

DESCRIPTION OF THE PREFERRED EMBODIMENTS

Figure 3:
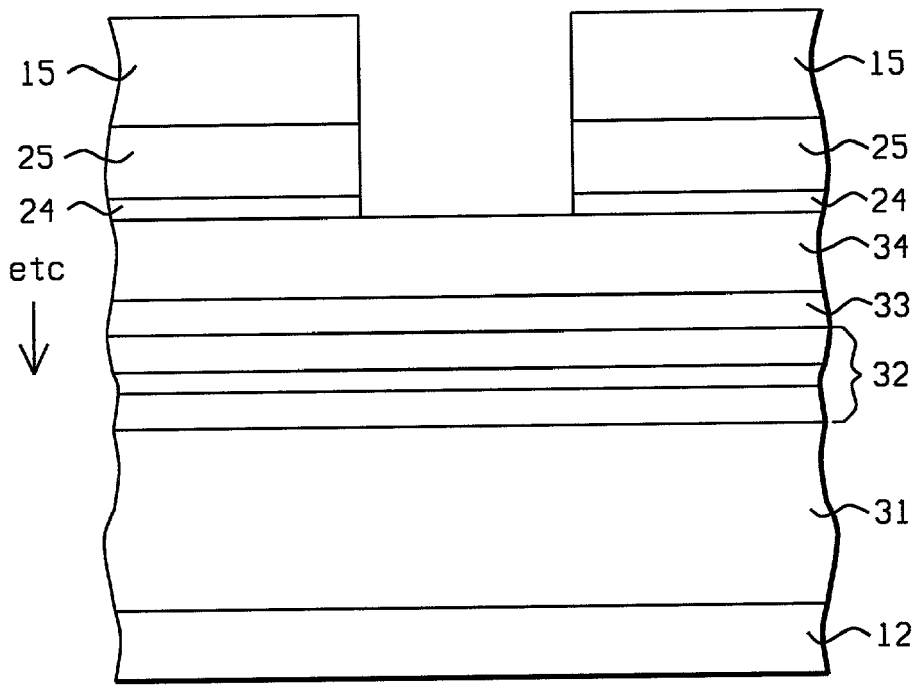
FIG. 3 illustrates an idealized approach to stabilizing the free layer outside of the read gap.

In the case of bottom spin valves, it would, in theory, be ideal if the AFM layer could be placed directly in contact with the free layer, with the sensor region being left uncovered to sense the external media field. This idealized structure is illustrated in FIG. 3. Seen there (in addition to features already shown in FIGS. 1 and 2) are pinning layer 31, pinned layer 32 (actually a 3-layer laminate), non-magnetic spacer 33, and free layer 34.

In practice, there are at least two problems associated with this approach. First, the GMR sensor as currently known to the art requires a special tantalum oxide capping layer to provide specular reflection at the upper surface of the free layer. However, the presence of such a capping layer means that there cannot be any exchange bias. Limiting the capping layer to the sensor region will require additional etch back to remove the exchange bias layer there or photo protection of the sensor region, which can be extremely difficult to control when the sensor size drops down to a tenth of a micron. It is possible in principle to use a lift-off process to avoid the extra etching step, but dimensional control and deposition over-spray become extremely difficult to control in this case.

Figure 4:
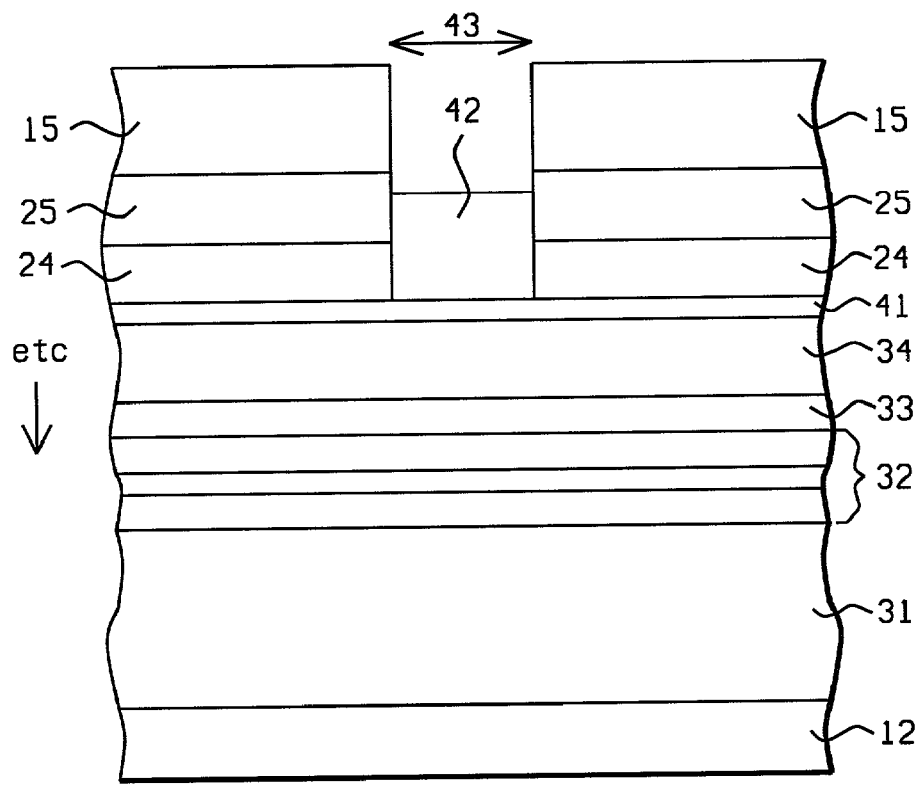
FIG. 4 illustrates the structure of the present invention which is a manufacturable version of the structure seen in FIG. 3.

As shown in FIG. 4, the present invention solves this problem by first introducing an exchange coupling layer 41 between ferromagnetic layer 24 and free layer 34. Additionally, layer 41 serves as an oxygen diffusion barrier and spin filter, thereby increasing the GMR ratio. Read gap 43 is then formed by selectively etching there all of layer 15 and at least part of layers 25 and 24, but not layer 41. A key novel feature of the invention is that layer 42 is almost as effective as the current tantalum oxide layer used by the art both as a protective layer and as a promoter of specular reflection at the upper surface of the free layer. This is confirmed in the data that is presented below in TABLE I:

TABLE I

| Layer 42 (pre oxidation) | Layer 42 thickness (Å) | Rs ohms/sq. | dR ohms | dR/R |
|---|---|---|---|---|
| tantalum | 10 | 14.91 | 1.694 | 11.36 |
| CoFe | 25 | 14.68 | 1.649 | 11.23 | where Rs is the sheet resistance and dR/R is the GMR ratio

Thus, substituting CoFe (which propagates exchange coupling) for tantalum (which does not) leaves the GMR ratio essentially unchanged.

To achieve good effective exchange coupling between layers 24 and 34 it is important to select the right materials for layer 41. Results obtained using several different layering combinations are summarized in TABLE II below:

TABLE II

| Layer 34 | layer 41 | | layer 24 | Hex | Hc |
|---|---|---|---|---|---|
| CoFe25 | Cu5 | | CoFe25 | 142 | 43 |
| | Cu9 | | | 156 | 17 |
| | Cu13 | | | 153 | 28 |
| CoFe25 | Ru9 | | CoFe25 | 173 | 13 |
| | Ru11 | | | 176 | 34 |
| | Ru13 | | | 186 | 44 |
| CoFe10/ | Ru11 | | NiFe25 | 86 | 14 |
| NiFe20 | Ru13 | | | 83 | 18 |
| CoFe10/ | Ru10 | | CoFe45 | 120 | 20 |
| NiFe20 | Ru7 | Cu3 | | 120 | 20 |
| | Ru5 | Cu5 | | 120 | 20 |
| | Ru3 | Cu7 | | 117 | 23 | where Hex is the exchange bias and Hc is the coercivity of the laminate

These results demonstrate that there is a large selection of various materials suitable for use in layer 41 (exchange coupling layer). It can thus be easily combined with GMR sensor considerations like high GMR ratio, low current shunting, effective spin filtering, good corrosion resistance, and appropriate magnetostriction to achieve the best GMR performance. Also, since the amount of layers 24 and 25 that gets removed prior to oxidation is not critical, the process of the present invention provides a large etch-back window having a tolerance of tens of Angstroms instead of only a few Angstroms. This makes manufacturing process control significantly easier.

We now provide a detailed description of the process of the present invention. In the course of so doing, the structure of the present invention will also became apparent. Referring once more to FIG. 4, the process of the present invention begins with the deposition on a suitable substrate (not shown) of seed layer 12. This is followed by the successive deposition of pinning layer 31, a pinned layer 32 (shown as a 3-layer laminate), non-magnetic spacer layer 33 and free layer 34.

Next, as a key feature of the invention, exchange coupling layer 41 is deposited. For the exchange coupling layer we have found any of the following to be suitable: Cu, Rh, Ag, or Ru, with Ru being preferred. The thickness of layer 41 has been between about 3 and 20 Angstroms, with about 11 Angstroms being preferred. This is followed by ferromagnetic layer 24, selected from among Fe, Co, and Ni, in any combination, including added Ta, Cr, V, or W. Layer 24 could also be a laminate of two or more layers. Its thickness is between about 5 and 50 Angstroms, with about 12 Angstroms being preferred.

Antiferromagnetic layer 25 is the next to be deposited. Any of NiMn, PtMn, IrMn, RhRuMn, CrMn, PtCrMn, PtInMn, FeMn, or NiFeMn could be used. Its thickness is between about 20 and 500 Angstroms (depending on which material is chosen), with about 40 Angstroms being preferred for the case of Ru. Last to be deposited is conducting lead layer 15. This has generally been gold but other materials such as Rh, Ni, Ag, Cu, Ti, or Ta could also have been used. Its thickness is between about 50 and 500 Angstroms.

Although it is optional to do so, all of these layers may be deposited during a single pumpdown since no additional processing occurs until all layers are in place. This offers obvious advantages with regard to convenience and elimination of inter-layer contamination.

Patterning and etching the structure using standard photolithographic techniques now follows, the result of etching being to form opposing plugs whose separation defines the read width 43 of the structure. As noted above, all of layer 15 must be removed but the exact amount of layers 24 and 25 that get removed is not critical, provided most of layer 41 remains. With this approach, read gap widths between about 0.02 and 0.3 microns are readily achieved.

Then, as another key feature of the invention, whatever remains of layers 24 and 25 inside gap 43 is oxidized together with the part of layer 41 that is present in the gap. Oxide layer 42 then serves to facilitate specular reflection of conduction electrons at its interface with layer 41 and also acts as a protective layer for free layer 34. The oxidation of layers 24 and 25 is achieved by user's choice of oxidation method including plasma oxidation, thermal oxidation, atomic oxidation, ion beam oxidation, and reactive ion oxidation.

The process ends with heating the structure in a magnetic field so as to fix the direction of magnetization in AFM layer 25 along a longitudinal direction (corresponding to horizontal in FIG. 4). Heating is at a temperature of between about 150 and 300° C. for between about 10 and 1,000 minutes in a magnetic field of between about 150 and 5,000 Oe (for the case of IrMn).

What is claimed is:

1. A magnetic read head structure, comprising:
a bottom spin valve structure having a topmost layer that is a free layer having an upper surface;
on said free layer, an exchange coupling layer;
on said exchange coupling layer, two opposing plugs of a laminate of a conducting lead layer on an antiferromagnetic layer on a ferromagnetic layer, said plugs being separated by a gap that defines a read width for the structure;
in said gap, a layer of oxides of said antiferromagnetic, ferromagnetic, and exchange coupling layers, said oxide layer being a protective layer for said free layer and providing for specular reflection of conduction electrons at said free layer upper surface; and
said ferromagnetic layer being permanently biased in a longitudinal direction by exchange coupling with said antiferromagnetic layer and said free layer outside of said gap being permanently biased in a longitudinal direction by exchange coupling with said antiferromagnetic layer through said exchange coupling layer.

2. The structure described in claim 1 wherein said exchange coupling layer is selected from the group consisting of Cu, Ru, Rh, and Ag, including being a laminate of more than one member of said group.

3. The structure described in claim 1 wherein said exchange coupling layer has a thickness between about 3 and 20 Angstroms.

4. The structure described in claim 1 wherein said ferromagnetic layer is selected from the group consisting of NiFe, CoFe, and a combination of CoFe and NiFe.

5. The structure described in claim 1 wherein said ferromagnetic layer has a thickness between about 5 and 50 Angstroms.

6. structure described in claim 1 wherein said antiferromagnetic layer is selected from the group consisting of NiMn, PtMn, IrMn, and RhRuMn.

7. The structure described in claim 1 wherein said antiferromagnetic layer has a thickness between about 20 and 500 Angstroms.

8. The structure described in claim 1 wherein said conducting lead layer is any combination of elements selected from the group consisting of Au, Rh, Ni, Ag, Cu, Ti, and Ta.

9. The structure described in claim 1 wherein said conducting lead layer has a thickness between about 50 and 500 Angstroms.

10. The structure described in claim 1 wherein said gap is between about 0.02 and 0.5 microns wide.

11. A magnetic read head structure, comprising:
a bottom spin valve structure having a topmost layer that is a laminate of CoFe and NiFe layers, said laminate being a free layer having an upper surface;
on said free layer, an exchange coupling layer that is a laminate of Cu and Ru;
on said exchange coupling layer, two opposing plugs of a conducting lead layer on an antiferromagnetic layer on a ferromagnetic layer, said plugs being separated by a gap that defines a read width for the structure;
in said gap, a layer of oxides of said antiferromagnetic and ferromagnetic layers, said oxide layer being a protective layer for said free layer and providing for specular reflection of conduction electrons at said free layer upper surface; and
said ferromagnetic layer being permanently biased in a longitudinal direction by exchange coupling with said antiferromagnetic layer and said free layer outside of said gap being permanently biased in a longitudinal direction by exchange coupling with said antiferromagnetic layer through said exchange coupling layer.

12. The structure described in claim 11 wherein said exchange coupling layer contains between about 30 and 70 atomic percent of Ru.

13. The structure described in claim 11 wherein said exchange coupling layer has a thickness of about 10 Angstroms.

14. The structure described in claim 11 wherein said ferromagnetic layer is CoFe.

15. The structure described in claim 11 wherein said ferromagnetic layer is about 45 Angstroms thick.

16. The structure described in claim 11 wherein said free layer further comprises about 10 Angstroms of CoFe on about 20 Angstroms of NiFe.

17. The structure described in claim 11 wherein said gap is between about 0.02 and 0.5 microns wide.

* * * * *